(12) United States Patent
Gaignet et al.

(10) Patent No.: US 9,745,207 B2
(45) Date of Patent: *Aug. 29, 2017

(54) SYSTEM AND METHOD FOR WATER PURIFICATION WITH AUTOMATIC PURGE

(75) Inventors: Yves Gaignet, Montigny le Bretonneux (FR); Didier Meyer, Paris (FR); Julien Bole, Montigny le Bretonneux (FR)

(73) Assignee: EMD Millipore Corporation, Billerica, MA (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/125,424

(22) PCT Filed: Jun. 20, 2012

(86) PCT No.: PCT/IB2012/053115
§ 371 (c)(1),
(2), (4) Date: Dec. 11, 2013

(87) PCT Pub. No.: WO2012/176135
PCT Pub. Date: Dec. 27, 2012

(65) Prior Publication Data
US 2014/0102990 A1 Apr. 17, 2014

(30) Foreign Application Priority Data
Jun. 24, 2011 (FR) ...................... 11 55632

(51) Int. Cl.
*B01D 63/00* (2006.01)
*B01D 61/00* (2006.01)
(Continued)

(52) U.S. Cl.
CPC ............... *C02F 1/004* (2013.01); *C02F 1/32* (2013.01); *C02F 1/444* (2013.01); *C02F 9/00* (2013.01); *C02F 9/005* (2013.01)

(58) Field of Classification Search
CPC ...... C02F 1/32; C02F 2201/002; C02F 1/325; C02F 1/444; B01D 61/145; B01D 61/147; B01D 61/58
(Continued)

(56) References Cited

U.S. PATENT DOCUMENTS 3,870,033 A * 3/1975 Faylor .................. B01D 61/08
165/163
3,992,301 A 11/1976 Shippey et al.
(Continued)

FOREIGN PATENT DOCUMENTS

CN 1196884 A 10/1998
CN 200961108 Y 10/2007
(Continued)

OTHER PUBLICATIONS

International Search Report and Written Opinion mailed Sep. 26, 2012 in co-pending PCT application No. PCT/IB2012/053114.
(Continued)

*Primary Examiner* — Ana Fortuna
(74) *Attorney, Agent, or Firm* — Nields Lemack & Frame, LLC

(57) ABSTRACT

The invention concerns a treated water purification system (107) comprising a water flow loop (110), said loop (110) being closed onto a tank (10) of treated water to purify, and said loop (110) successively comprising, in the direction of flow of the water downstream of the tank (10), at least one pump means (102), at least one first filtration means (103), at least one second filtration means (104) and at least one point of use (U), the system (107) being characterized in that it further comprises at least one diversionary pipe (112) linking the first filtration means (103) to the tank (10), and a loop return pipe (114) linking the second filtration means (104) to the tank (10). Method for use of such a system.

9 Claims, 2 Drawing Sheets

Figure 3:
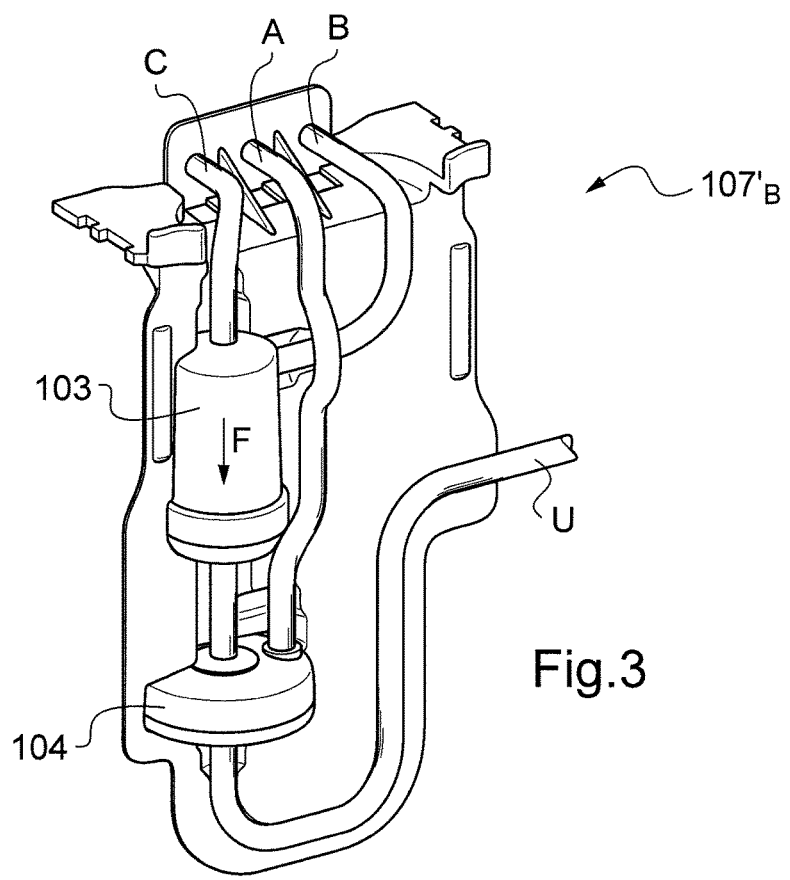

(51) Int. Cl.
  *C02F 1/78* (2006.01)
  *C02F 1/44* (2006.01)
  *C02F 1/00* (2006.01)
  *C02F 1/32* (2006.01)
  *C02F 9/00* (2006.01)

(58) Field of Classification Search
  USPC .................................... 210/900, 651, 760
  See application file for complete search history.

(56) References Cited

U.S. PATENT DOCUMENTS

| | | | |
|---|---|---|---|
| 4,261,834 A | 4/1981 | deWinter | |
| 4,495,067 A | 1/1985 | Klein et al. | |
| 4,623,467 A | 11/1986 | Hamlin | |
| 4,698,153 A | 10/1987 | Matsuzaki et al. | |
| 4,773,993 A | 9/1988 | Yoda et al. | |
| 4,801,375 A | 1/1989 | Padilla | |
| 4,810,388 A | 3/1989 | Trasen | |
| 4,969,991 A | 11/1990 | Valadez | |
| 5,024,766 A | 6/1991 | Mahmud | |
| 5,259,954 A | 11/1993 | Taylor | |
| 5,762,789 A | 6/1998 | de los Reyes et al. | |
| 5,769,539 A | 6/1998 | Tsang et al. | |
| 5,851,390 A | 12/1998 | Lemonnier | |
| 5,911,884 A | 6/1999 | Boulter | |
| 5,935,441 A * | 8/1999 | O'Neill ............... | C02F 1/32 210/638 |
| 6,074,551 A | 6/2000 | Jones et al. | |
| 6,146,524 A | 11/2000 | Story | |
| 6,264,836 B1 | 7/2001 | Lantis | |
| 6,464,867 B1 * | 10/2002 | Morita ............... | B01F 3/04985 210/202 |
| 7,250,619 B2 | 7/2007 | Taylor et al. | |
| 8,480,906 B2 * | 7/2013 | Kobayashi ............... | C02F 9/00 210/660 |
| 2002/0179508 A1 | 12/2002 | Nachtman et al. | |
| 2003/0057155 A1 | 3/2003 | Husain et al. | |
| 2003/0094406 A1 | 5/2003 | Smith | |
| 2004/0050762 A1 | 3/2004 | Xia et al. | |
| 2004/0232079 A1 | 11/2004 | Taylor et al. | |
| 2005/0061737 A1 | 3/2005 | Linden et al. | |
| 2006/0091077 A1 | 5/2006 | Haas et al. | |
| 2008/0230450 A1 | 9/2008 | Burbank et al. | |
| 2009/0084734 A1 | 4/2009 | Yencho | |
| 2009/0134080 A1 | 5/2009 | Fabig | |
| 2014/0124455 A1 | 5/2014 | Gaignet et al. | |

FOREIGN PATENT DOCUMENTS

| | | |
|---|---|---|
| CN | 201648052 U | 11/2010 |
| DE | 20-2005-011219 U1 | 9/2005 |
| EP | 0096377 A1 | 12/1983 |
| EP | 2132913 A | 7/1984 |
| EP | 0385050 A1 | 9/1990 |
| EP | 0417506 A1 | 3/1991 |
| EP | 1875818 A2 | 1/2008 |
| FR | 2425881 A1 | 12/1979 |
| FR | 2896792 A1 | 8/2007 |
| GB | 2070900 A | 9/1981 |
| JP | 6-277665 A | 10/1994 |
| JP | 6-304559 A | 11/1994 |
| JP | 7-60291 A | 3/1995 |
| JP | 8-252440 A | 10/1996 |
| JP | 8-252600 A | 10/1996 |
| JP | 10-151464 A | 6/1998 |
| JP | 10-337567 A | 12/1998 |
| JP | 11-244895 A | 9/1999 |
| JP | 3223660 B2 | 10/2001 |
| JP | 2005-254193 A | 9/2005 |
| JP | 2009-285565 A | 12/2009 |
| WO | 00/12435 A1 | 3/2000 |
| WO | 2009/044288 A2 | 4/2009 |

OTHER PUBLICATIONS

International Preliminary Report on Patentability mailed Jan. 9, 2014 in co-pending PCT application No. PCT/IB2012/053114.
International Search Report and Written Opinion mailed Sep. 26, 2012 in corresponding PCT application No. PCT/IB2012/053115.
International Preliminary Report on Patentability mailed Jan. 9, 2014 in corresponding PCT application No. PCT/IB2012/053115.
English translation of Japanese communication mailed Apr. 7, 2015 in corresponding Japanese patent application No. 2014-516478.
Office Action mailed Sep. 28, 2015 in co-pending U.S. Appl. No. 14/125,412.
Final rejection mailed Apr. 6, 2016 in co-pending U.S. Appl. No. 14/125,412.
Office action mailed Jun. 13, 2016 in co-pending U.S. Appl. No. 14/125,412.
Final rejection mailed Jan. 3, 2017 in co-pending U.S. Appl. No. 14/125,412.
Office action dated Jun. 16, 2017 in co-pending U.S. Appl. No. 14/125,412.

* cited by examiner

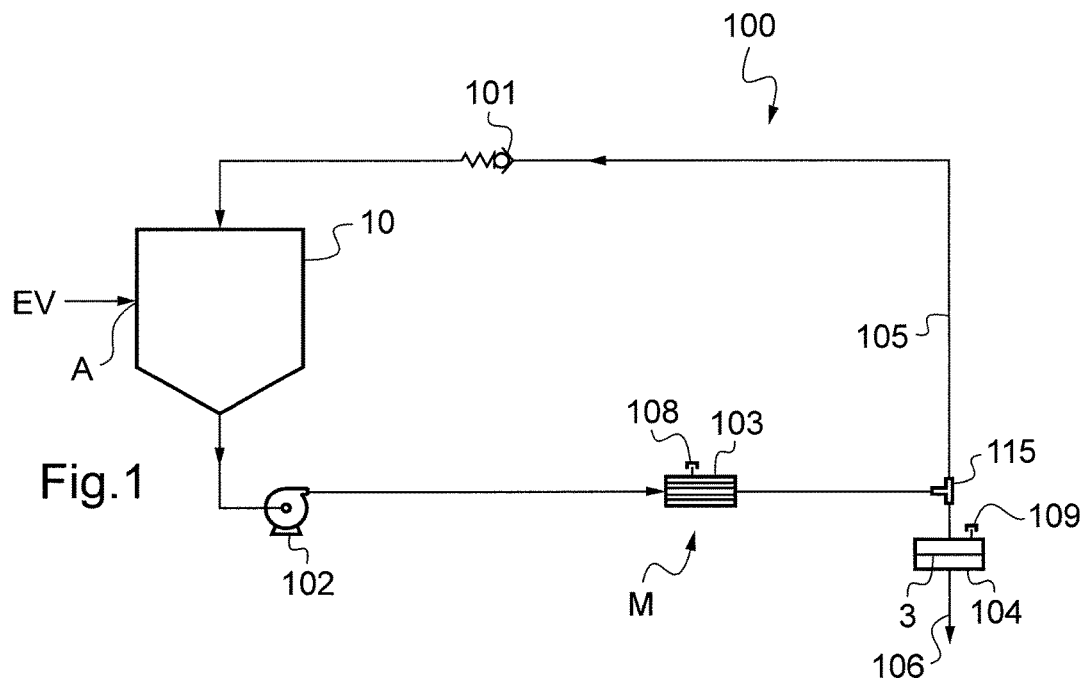
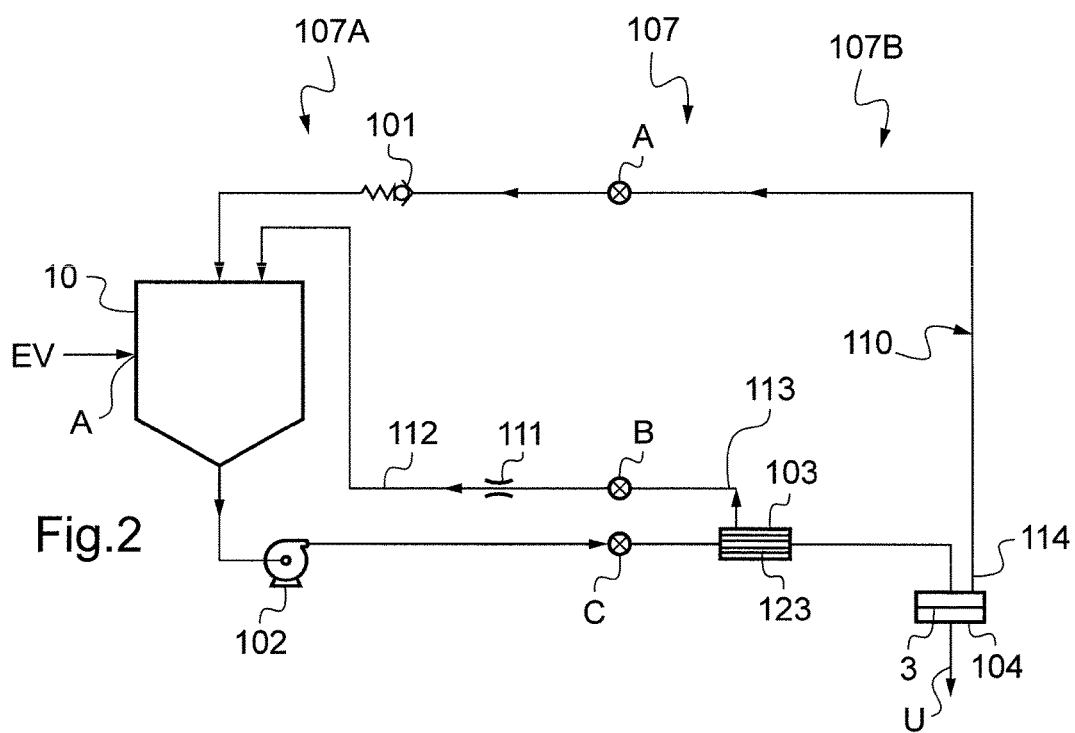

SYSTEM AND METHOD FOR WATER PURIFICATION WITH AUTOMATIC PURGE

The invention concerns a water purification system, with automatic purge of the water filtration components enabling the production and dispensing of purified water. The invention also relates to a method of purifying water using such a system.

Numerous applications, in particular in analytical chemistry and analytical biology laboratories, require the use of pure or even ultra-pure water. These systems are also used for medical treatments, for example dialysis, or for biological analyzers (for blood, urine, etc.) which require a very high level of purification.

Water purification systems have been designed to produce water of the desired quality, most frequently for analytical laboratory equipment, medical hemodialysis equipment or biological analyzers.

In this context, the dispensing of pure or ultrapure water generally enables the dispensing of purified water with a pyrogen level below 0.005 EU/mL, and a bacterial level below 100 CFU/L. CFU means "Colony Forming Unit". EU means "Endotoxin Unit". Both parameters CFU and EU are measured with reference to a volume of liquid.

Thus, FIG. 1 illustrates a system 100 for water purification according to the prior art.

In FIG. 1, the system 100 produces pure or ultra-pure purified water, ready to be dispensed to a user at a point of use 106. The system 100 consists of a flow loop 105 which comprises a tank 10 for pure or ultrapure water, filled with pure or ultrapure water EV (obtained by reverse osmosis and/or electrodeionization) at a supply point A and, connected to the bottom of the tank 10, downstream in the direction of flow of the water, a pump 102 making it possible to supply the flow of desired purified water to the point of use 106, to maintain a stream within the closed flow loop 100 and to compensate for head losses specific to the filtration components and the hydraulic circuit, a filtration component 103 which is generally an ultrafiltration filter or an absolute ultra-filter, and a filtration component 104 which is generally a microfiltration filter comprising a filter membrane 3, the filtration component 104 being positioned on a diversion on a T-connector 115 of the purified water loop 105.

The point of use 106 from which the user draws off the purified water from the system 100 is situated at the location of the filter 104, downstream of the membrane 3. The purified water not drawn off by the user continues to flow in the closed loop 105, towards the tank 10, via a valve 101. The valve 101 is generally of the calibrated valve (or spring loaded check) or discharge valve type. The assembly of the pump 102 and of the valve 101 generates pressure in the loop 105, and in particular at the entry of the filter 104, enabling a sufficient rate of flow to be obtained at the filter outlet 106, and also to recycle, at the tank 10, the excess purified water produced (or the entirety of the purified water produced if the drawing off has terminated).

The presence of the tank 10 on this flow loop 105 provides the user with a store of treated water which adapts to the flow requirements of the user. According to a variant (not shown), the return from the loop 105 may be made directly upstream of the pump without passing via the tank, the tank 10 serving as a store of water to treat.

The filters 103 and 104 each comprise at least one hydrophilic membrane which is airtight when wet. The air or any residual gas contained in the filters must be purged in order for the water to pass through the membrane. This is true on commissioning the filter, but also during operation, since any dissolved gas contained in the flowing water may form gas bubbles creating one or more air pockets in the filters, increasing the head loss of the membrane and reducing the rate of flow of the water within the purified water flow loop.

According to this prior art, the user is required to perform venting to the atmosphere by opening each of the manual purge valves 108 and 109 respectively for the respective filters 103 and 104, at regular intervals. In general, the user opens the purge valves 108 and 109 on commissioning, then at regular intervals during the entire operation. This is not always easy since access to the manual purge valve 108 or 109 may be limited, and purified water is released to the exterior of the filter 103 or 104 at each purge. Furthermore, as is the case for example for the maintenance of hemodialysis apparatuses, the user may be a patient and not a technician, which makes it all the more delicate to have him or her perform a manual purge.

Another device, described in patent application US 2008/0230450 A1 uses the property of a hydrophobic membrane mounted at the outlet of the filter vent to obtain an automatic purge of the filter. Nevertheless, this configuration carries the risk of undesired water outletting if the pressure is high (i.e. above the bubble point of the hydrophobic membrane), the potential for water to blind the vent filter pores and reduce its ability to pass gases effectively and/or a risk of contamination by passage of microorganisms through that filter.

Another device, different from the other two preceding devices and as illustrated for example in patent U.S. Pat. No. 5,851,390, uses a hydrophobic membrane filter assembled with hydrophilic membranes. Such a device enables automatic purging. Nevertheless, the integrity of the filter cannot be ensured, as the hydrophobic membrane prevents the integrity of the filter from being measured.

Numerous devices for producing apyrogenic sterile water, for example described in the patents U.S. Pat. No. 5,259,54, U.S. Pat. No. 7,250,619, U.S. Pat. No. 4,495,67, and U.S. Pat. No. 4,810,388 use one or more single-use filters in line to produce purified water, in the absence of any recirculation loop and automatic purging device for the filter or filters.

Thus the problem which arises is to design and produce a system for water purification making it possible to dispense the purest possible purified water, that is to say that is the least contaminated possible, while as much as possible avoiding technical involvement by the user, in particular for purging the device, as well as to ensure an acceptable time of use for the user and at the same time guaranteeing the quality of the water produced.

The system according to the invention advantageously enables an efficient solution to be provided, and to mitigate the drawbacks of the prior art devices.

To that end, one aspect the invention concerns a treated water purification system comprising a water flow loop, said loop being closed onto a tank of treated water to be purified, and said loop successively comprising, in the direction of flow of the water downstream of the tank, at least one pump means, at least one first filtration means, at least one second filtration means, and a point of use, the system being characterized in that it further comprises at least one, preferably one, diversionary pipe linking at least the first filtration means to the tank and a loop return pipe linking the second filtration means to the tank.

The loop return pipe is a purified water flow pipe.

In general, the point of use is situated downstream of the membrane of the second filtration means, when the second filtration means comprises a membrane.

Advantageously, this system comprising two filtration means enables water of good quality to be obtained for a given time, if the treated water supplying the system is of good quality, and free of contamination. Nevertheless, according to a preferred embodiment of the invention, it may be necessary and/or preferred to regularly decontaminate the hydraulic circuit.

The diversionary pipe and the return pipe are each a purging pipe which makes it possible to perform automatic purging of any residual gas that has accumulated in the filtration means concerned therewith and the elimination of dead volumes of water. Most frequently, when the filtration means comprises a membrane, these gases have been accumulated at the surface respectively of the membrane of the first and second filtration means. Furthermore, the residual gas is generally returned to the atmosphere at the tank.

This is very advantageous. As a matter of fact, the existing purification systems only enable manual purging to be performed. However, this purging operation is delicate to carry out, in particular for a dialysis system since the user is a patient and not a qualified technician.

In general, the first filtration means linked to the diversionary pipe contains at least one membrane, and the diversionary pipe is situated upstream of the membrane or membranes of the first filtration means.

According to the invention the use of filter systems having one inlet and two outlets as described for example in the patent document U.S. Pat. No. 5,762,789 or GB 2,132,913 advantageously facilitates the connection for a diversionary pipe for the automatic purging.

The diversionary pipe is generally and preferably configured such that any residual gas contained in the filtration means is transported by the water passing via that diversionary pipe, thereby evacuating that gas to the atmosphere in the tank and preventing the formation of any pocket of dead volume. In all cases, the rate of flow of the water in the diversionary pipe is sufficient to purge the first filtration means and, in particular when the first filtration means comprises a membrane, is sufficient to purge the gasses that have accumulated upstream of and on said membrane. The flow in the diversionary pipe may advantageously be limited, for example by using a restricting means or by reducing the diameter of tube constituting the diversionary pipe. It is also possible for the diversionary pipe to constitute the downstream part of the flow loop. This is particularly advantageous when there is no drawing off at the point of use.

Thus, the diversionary pipe is preferably configured such that only a small part of the flow of the water capable of flowing in the flow loop passes via that diversionary pipe. Here "small part" means below 30%, preferably from 5 to 10%, of the flow. Thus, most of the water generally flows in the loop. The person skilled in the art is capable of providing suitable dimensions for the diversionary pipe, taking into account the other parameters of the closed flow loop. Generally, he calculates the dimensions for the diversionary pipe for purging the gases that have accumulated in the filtration means while complying with the linear speed in the pipes constituting the loop. This advantageously enables the formation of any biofilm on their walls to be avoided.

The loop return pipe is generally configured such that the water flow in that pipe purges the second filtration means. Thus, when the second filtration means comprises a membrane, the flowing water flushes the surface on the upstream side of the membrane, so as to eliminate the dead volume of water and to purge the gases that have accumulated upstream of and on that membrane.

According to the invention, the term treated water is used for the water present in the tank, even if at least part of that water has been purified.

According to the invention, the term purified water is used for the water flowing in the loop, even if at least part of that water has been treated and not fully purified.

The purified water produced according to the invention advantageously has a very low level of microorganisms including bacteria (less than 100 CFU/L) and pyrogens (less than 0.005 EU/mL).

The pump means is preferably a pump. Furthermore, the pump means is preferably associated with a check means (or a back pressure means) present on the loop, said check means preferably being a check valve (or a spring-loaded check valve). The pump means advantageously enables the desired quantity of purified water to be provided at the point of use and to maintain a stream within the closed flow loop by compensating for the head losses specific to the filtration and hydraulic circuit components.

According to the invention, the system comprises a first filtration means, which is preferably an ultrafiltration filter. This ultrafiltration filter generally comprises at least one membrane. This ultrafiltration filter is defined according to the invention as a filter comprising a membrane whose cut-off threshold generally varies from 1,000 to 1,000,000 Da. The cut-off threshold is chosen by the person skilled in the art according to the performance sought. This ultrafiltration filter generally retains the molecules present in the fluid in which they may or may not be dissolved, the molecular weight constituting the determining factor in the retention on account of the choice of the membrane. In the context of the invention, the retention threshold is generally chosen to enable depyrogenation of the water.

The first filtration means may also be a positively charged absolute filter, advantageously combining the properties of a 0.1 μm or 0.22 μm filter and the properties of an ultrafiltration filter. To be precise, its positive charge enables the absorption of the pyrogens by affinity rather than or in addition to molecular weight exclusion.

The first filtration means is generally situated downstream of the pump means and upstream of the second filtration means close to the point of use.

The second filtration means is generally a filtering component or filter, most often preferably an absolute filter. This absolute filter generally comprises at least one membrane for example a filter comprising a membrane of pore diameter 0.22 μm or 0.1 μm.

The loop return pipe serves as a pipe for purging that filter. The loop return pipe is generally situated upstream of the membrane, in the direction of flow of the water in the loop, when the second filtration means is a membrane filter.

Preferably according to the invention, the integrity of all the filtration means of the system of the invention has been tested, before commissioning, to 100%.

The point of use is generally situated at the location of the second filtration means, and still more preferably on said filtration means, most often on a diversion from the loop and downstream of the membrane when the second filtration means comprises a membrane. The second filtration means is thus generally qualified as "final".

This advantageously enables complete separation, generally by the membrane, between the loop and the point of use. The second filtration means may also be situated in line on the loop, the water flowing in the loop passing through the filter that it constitutes, and the point of use being situated on the loop downstream of said filter. Nevertheless this is not preferred. As a matter of fact, in such a case, the point of use is not separated from the loop (for example by a membrane), and there is a risk of back-contamination of the water at the point of drawing off.

Consequently, advantageously according to the invention, each filtration means is preferably associated with a purge line or pipe, which is adapted to operate automatically.

The system according to the invention may also further comprise at least one sterilization means. This sterilization means generally comprises at least one U.V. lamp, preferably at least two U.V. lamps. Advantageously, this sterilization means makes it possible to maintain the performance of the system for a certain period.

In the context of the invention, "sterilization by UV" is used to mean the action of destruction, generally in continuous operation, of the living elements by means of bactericidal ultraviolet radiation or radiations. The ultraviolet radiation is most often at 254 nm.

Thus, the system of the invention may comprise at least one sterilization means, for example a UV lamp, at the location of the tank, for example and preferably mounted in the tank. This sterilization means of the tank is adapted to sterilize the treated water potentially present in the tank, as well as the condensate or condensates attached to the walls of the tank in the non-immersed regions. Such a sterilization means advantageously enables the hydraulic circuit, which is the closed loop, to be decontaminated regularly and intermittently (i.e. at regular intervals, for example 4 sessions of 15 minutes per day) or continuously.

Independently or not, the system of the invention may comprise at least one sterilization means on the flow loop. Such a sterilization means is preferably a U.V. lamp disposed on the loop. This sterilization means of the flow loop advantageously provides a means for sterilization of the water flowing in the loop, and is most often situated upstream of the first and second filtration means, which advantageously limits biofilm formation and the development of microorganisms in the loop.

The sterilization means is generally a U.V. mercury vapor lamp emitting bactericidal ultraviolet radiation, it being possible for this lamp to be replaced by one or more LEDs ("light emitting diodes"), or a discharge lamp also emitting bactericidal radiation.

According to the invention, it is furthermore preferred for part of the system according to the invention, and more specifically the part of the flow loop comprising the filtration means, preferably the first and the second filtration means when both are present, and the adjoining circuit components, to be a set of consumable components. According to invention, "consumable components" means the disposable components whose performance is qualified for a specific life or specific volume of purified water dispensed at the point of use.

The consumable components are in general constituted by the first and second filtration means and adjoining pipes, and most often also comprise the point of use.

The set of consumable components generally forms a single part and if possible is delivered in its packaging in a condition which is sterile or decontaminated, by irradiation or other technique. This enables fast and easy changing of that consumable part using a simple mechanical connection means reducing the risk of contamination of the loop or of the filtration component or components. The set has a limited life or a limited water treatment capacity, to ensure the integrity of its performance during its period of use. The set may also comprise a means for detection and recognition enabling its presence on the loop to be analyzed and to trace its life or the volume of treated water. The detection means may be in the form of an RFID tag, bar code, memory circuit or optical or mechanical polarizing device or other means. One could use a sterile connector on each end of the disposable loop, such as a LYNX S2S connector, that allows him to make a sterile to sterile connection between the disposable and the rest of the system it attaches to.

The treated water production system which supplies the water purification system according to the invention in general comprises a reverse osmosis treatment device, to which may be added a deionizing step of ion exchange resin type or an electrodeionizing module.

The invention also concerns the use of the system according to the invention. Thus, the invention especially concerns a method of use of such a system. Said method is generally a method of purifying treated water comprising making the treated water flow in a closed water flow loop, said method comprising at least one step of supplying the loop with treated water, and at least one step of placing water in storage by supplying at least one tank present on said loop, the purifying method comprising at least two filtration steps, the first filtration step by at least one first filtration means being preferably an ultrafiltration step, and the second filtration step by at least one second filtration means preferably being a microfiltration step, the method comprising at least one step of extraction (or delivering) at the time of the second filtration step, said method being characterized in that it comprises at least one step of purging the first filtration means by causing part of the water flowing in the loop to flow in a diversion from the loop, and at least one step of purging the second filtration means by causing water flowing in the loop to flow between the second filtration means and the tank.

Preferably, the first and the second filtration means are each a membrane filter. In such a case, according to a preferred variant, the method is such that any residual gas from the first and/or the second filtration means is returned to the atmosphere in the tank. In particular, the method according to the invention advantageously performs an automatic purge by making water in the loop flow on the upstream of the filter membrane of each of the first and second filtration means, thereby eliminating the dead volume and evacuating any residual gas at the upstream surface of the membrane.

The method according to the invention is preferably performed continuously, that is to say that the water continuously flows in the loop and the diversion of the loop, if present. The method according to the invention further comprises, preferably, at least one sterilization step, generally of the water flowing in the loop and/or present in the tank. This sterilization step is generally performed by at least one sterilization means. According to this embodiment, since the water flowing in the loop passes via at least one sterilization step, this water is continuously purified.

The step of extraction of water via the point of use is carried out continuously or discontinuously, according to the needs of the user.

Preferably, the method according to the invention comprises at least one additional step of measuring the volume of water in the tank using a level sensor or an automatic filling valve enabling automatic filling of the tank from a treated water production system, continuously or discontinuously between a starting level for the filling and a stopping level for the filling.

Figure 4:
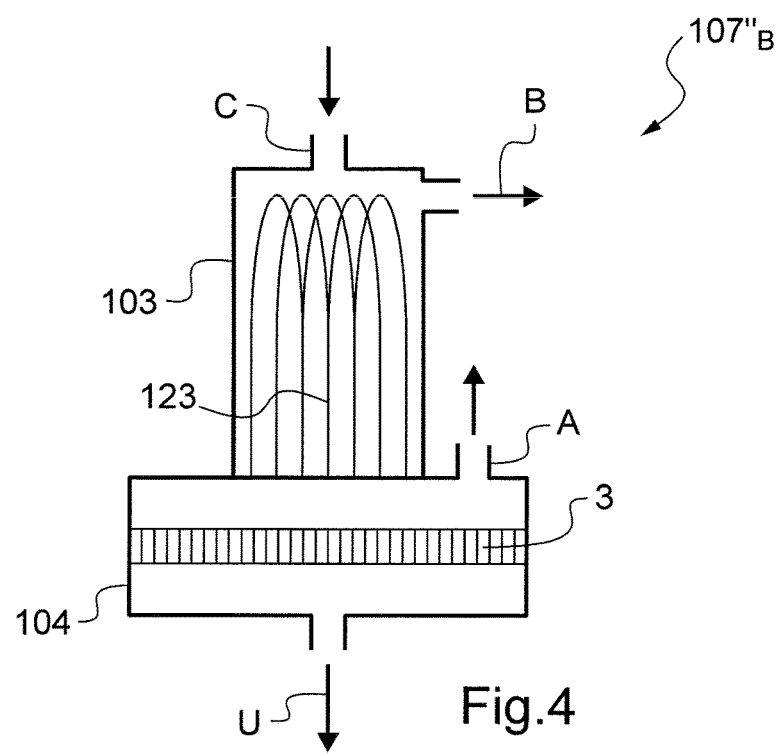

The invention will be better understood in the light of the accompanying drawings which include:

FIG. 1 is a diagram of a system for water purification according to the prior art, FIG. 2 is a diagram of a system for water purification according to the invention, FIG. 3 is a diagram in perspective of a disposable consumable module using two filtration components which is usable in the system of FIG. 2, and FIG. 4 is a diagram in cross-section of a compact disposable consumable module using two filtration components assembled in the same casing and which is usable in the system of FIG. 2.

The same references represent identical components in the drawings.

FIG. 1 has been commented upon in the preamble.

FIG. 2 is a diagram of a system 107 for water purification according to the invention. The system 107 consists of a water flow loop 110 which comprises a fixed part 107A and a disposable or consumable part 107B, and which is closed onto a vessel 10 forming a tank.

The loop 110 comprises, in the direction of flow of the water in the loop, a pump 102, a first filter 103 for ultrafiltration comprising a membrane 123, and a second filter 104 for microfiltration comprising a membrane 3, and at the location of which is situated a point of use (on a diversion) and finally valve 101 on the return for water to the tank 10.

According to the invention, the system 107 comprises a transverse purge pipe (113, 112), which is a diversionary pipe relative to the flow loop 110. The pipe 113 then 112 links the first filtration component 103 to the tank 10, and enables the flow of a small part of the water flowing in the loop through the purge pipe (112, 113). The diversionary pipe 113 supplies water to a means 111 for regulating the rate of flow of water flowing to the tank 10, for example by mechanical restriction such as a valve or particular reduction in the diameter of the tube used for the pipe 113, then the pipe 112 conveys the water coming from means 111 to the tank 10.

The pipe (112, 113) may also comprise a means for evacuation (not shown in FIG. 2) of the gases flowing therein which are the air trapped beforehand on the membrane 123 and the dissolved gases. The air evacuation means operates thanks to the positioning of the filter 103, its connection onto the pipe 113 and the positioning of the pipe 112 relative to the tank 10. The air and the residual dissolved gases are then evacuated into the tank 10, then to the atmosphere. Typically, the tank is essentially a closed system and communications to the outside environment via a hydrophobic gas filter which allows gases to move across the filter but prevents external contaminants such as dirt, dust or bacteria to pass through the filter into the tank 10.

The other diversionary pipe serving for the purging of the second filtration component 104 uses the return line 114 of loop 110 between the filtration component 104 and the tank 10. This line 114 makes it possible to evacuate any residual gas trapped upstream of the membrane 3 of the filtration component 104 and any gas on that membrane 3, by flushing of the upstream side of the membrane 3. For this, the filtration component 104 possesses an inlet and an outlet upstream of the membrane 3, which advantageously makes it possible to eliminate the dead volume upstream of the membrane 3 when the user is not using purified water at outlet U and when all the purified water is flowing in the line 114.

Generally, the first and second filtration components 103 and 104 are positioned such that their purge outlets are placed upwardly. This enables the effectiveness of the purge to be ensured.

Furthermore, there are three hydraulic connection and fastening points A, B and C for the consumable part 107B. Thus a connection point C is located in the part of the loop 110 situated downstream of the pump 102, and upstream of the first filter 103. The diversionary pipe 113 comprises a connection point B. Lastly, the part of the loop 110 situated downstream of the second filter 104 and upstream of the valve 101 comprises a connection point A.

It is very easy to separate the consumable part 107B, comprising the first and second filtration components 103 and 104 and the pipes concerned therewith, from the fixed part 107A remaining at the points A, B, and C and to mount a new part 107B, which is clean and sterile, if the recommended time of use has been attained or further to an analysis of the water showing a degradation in the quality of the water FIGS. 3 and 4 each diagrammatically represent a consumable part respectively 107'B and 107"B.

The consumable part, or module, 107'B represented in FIG. 3 uses separate filters 103 and 104 which are linked by flexible tubes placed in a cassette comprising the three connections A, B and C as well as a mechanical locking system. Arrow F indicates the direction of flow of the major part of the water in the loop 110, towards the point of use U.

In the product example presented in FIG. 3, the rate of flow in the diversionary pipe 112 at point B is 0.2 liters per minute. The rate of flow of the water at point C, exiting pump 102, is 1.8 liters per minute. The rate of flow of water for the user, at the point of use U, may thus attain 1.6 liters per minute.

The consumable part, or module, 107"B represented in FIG. 4 uses filters 103 and 104 whose cases are mechanically assembled together, which enables a reduction in the number of parts and compactness for the assembly. This disposable module 107"B containing the filter membranes may replace the individual filters of FIG. 3, or may be used alone linked to the connections A, B and C by hydraulic tubes.

The invention will be better understood in the light of the following example, which illustrates the invention without however limiting the scope thereof.

EXAMPLE

This example illustrates a preferred embodiment of the invention with the presence of a U.V. lamp which is adapted to the quality of the supply water for this test. The person skilled in the art is capable of considering that this example could be carried out with purer supply water and without the presence of a U.V. lamp.

In tables 1 and 2 below, contamination values were obtained using treated water coming from a reverse osmosis (RO) and electrodeionization (EDI) water treatment system, and by purifying with a system comprising a fixed part 107A as represented in FIG. 2 and a consumable part 107'B as shown in FIG. 3 with furthermore the presence of a U.V. lamp (not shown in FIG. 2, situated between the reservoir and the pump inlet). The first filter 103 comprises an ultrafiltration membrane whose cut-off threshold is 13 000

Da and the second filter 104 is an absolute filter the membrane of which has a pore diameter of 0.22 µm.

The power of the mercury vapor UV lamp is 17 W.
The operating rates of flow are:
Outlet of pump 102: 1.8 L/min (constant)
Purging pipe 112: 0.2 L/min (constant)
Drawing off from the point of use U: 0.5 L/min (on average), 1.1 L/min (maximum)
Production of treated water entering the supply point A: 0.5 L/min (constant)

The measurements were made over a period of 135 days. The values obtained (on average) are presented in the following Table 1.

Water samples are taken from the outlet of the final filter using a sampling valve and the membrane filtration method (Millipore Milliflex with 0.45 µm pore size membrane).

After filtration, the membrane is incubated on growth media plate (R2A and TSA) during 5 days at 35° C.

After incubation time, the CFU on membrane are counted and noted on Table 1 and 2.

TABLE 1

| Contaminants | Treated water entering the tank | Outlet from the UV lamp situated upstream of 102 | Point of use U |
|---|---|---|---|
| Bacteria (CFU/Liter) | 10 000-30 000 | <1000 | <100 |
| Endotoxins (EU/ml) | 0.0281 | 0.009 | <0.005 |

The daily measurement are summarized in Table 2 below.

TABLE 2

| | R2A growth medium | | TSA growth medium | |
|---|---|---|---|---|
| Number of days | Standard deviation | CFU/L (average over 5 samples) | Standard deviation | CFU/L (average over 5 samples) |
| 5 | 4 | 7 | 5 | 13 |
| 7 | 10 | 20 | 5 | 18 |
| 9 | 7 | 42 | 5 | 50 |
| 12 | 7 | 38 | 9 | 35 |
| 15 | 12 | 32 | 9 | 33 |
| 17 | 7 | 45 | 6 | 28 |
| 22 | 11 | 36 | 11 | 36 |
| 29 | 3 | 22 | 4 | 20 |
| 31 | 1 | 11 | 4 | 8 |
| 38 | 4 | 14 | 9 | 14 |
| 42 | 5 | 17 | 6 | 19 |
| 45 | 4 | 11 | 2 | 4 |
| 49 | 5 | 12 | 5 | 12 |
| 52 | 2 | 6 | 2 | 4 |
| 55 | 8 | 9 | 8 | 11 |
| 57 | 5 | 8 | 3 | 9 |
| 65 | 5 | 11 | 7 | 12 |
| 70 | 4 | 10 | 6 | 7 |
| 72 | 8 | 11 | 7 | 14 |
| 81 | 4 | 5 | 2 | 2 |
| 85 | 3 | 8 | 4 | 8 |
| 101 | 25 | 33 | 21 | 30 |
| 108 | 2 | 3 | 2 | 2 |
| 116 | 2 | 4 | 2 | 2 |
| 124 | 9 | 8 | 4 | 6 |
| 135 | 5 | 13 | 9 | 9 |

The effectiveness of the system according to the invention can thus be seen, which is simple to use and which enables ultra-pure water to be produced in a way which is stable over time.

The invention claimed is:

1. A treated water purification system comprising a water flow loop, said loop being closed onto a tank of treated water to purify, and said loop successively comprising, in the direction of flow of the water downstream of the tank, at least one pump, at least one first filter comprising a first membrane having a feed side and a retentate side and producing a permeate, at least one second filter comprising a second membrane through which said permeate from said first membrane is directed and passes and at least one point of use connected to said permeate from said second membrane, said second membrane having a retentate side,
   the system further comprising at least one diversionary pipe connected to said retentate side of said first membrane and linking the first filter to the tank, and a loop return pipe connected to said retentate side of said second membrane and linking the second filter to the tank,
   wherein the diversionary pipe is configured such that below 30% of the flow of the water capable of flowing in the flow loop passes via said diversionary pipe,
   wherein residual gas that has accumulated in said first and second filters is returned to the atmosphere at the tank,
   wherein all retentate from said retentate side of said first membrane is returned to said tank via said diversionary pipe, and all retentate from said retentate side of said second membrane is returned to said tank via said loop return pipe, and
   wherein at least one UV sterilizer is mounted in said tank or on said flow loop.

2. A system according to claim 1, wherein the at least one pump is associated with a valve present on the loop return pipe.

3. A system according to claim 1, wherein the second filter is an absolute microfilter.

4. A system according to claim 1, wherein the first filter is an ultrafiltration filter.

5. A system according to claim 1, wherein the first and second filters are provided as a disposable module.

6. A system according to claim 1, wherein said first membrane is connected to said diversionary pipe via a first purge outlet, said second membrane is connected to said loop return pipe via a second purge outlet, and wherein said first and second purge outlets are positioned upwardly.

7. A system according to claim 1, wherein there is a UV sterilizer mounted in said tank and a UV sterilizer mounted on said flow loop.

8. A method of purifying treated water comprising making the treated water flow in a closed water flow loop, said method comprising supplying the loop with treated water and placing water in storage by supplying at least one tank present on said loop, the purifying method comprising filtering with at least one first filter comprising a first membrane, and filtering with at least one second filter comprising a second membrane, said second filter filtering permeate from said first filter, the method comprising at least one point of use of permeate produced in said at least one second filter,
   said method further comprising purging a feed side of the first filter of air by causing part of the water flowing in the loop to flow in a diversion pipe from the loop linking the first filter to the tank, and purging a feed side of the second filter of air by causing water flowing in the loop to flow between the second filter and the tank,
   wherein all of the water flowing in the diversion pipe linking the first filter to the tank is returned to said tank, and sterilizing the water in storage in said tank with a UV sterilizer in said tank, or sterilizing the water in said flow loop with a UV sterilizer mounted on said flow loop.

9. A purifying method according to claim 8, wherein the method further comprises sterilizing said water in said water flow loop with a UV sterilizer mounted in said water flow loop, and sterilizing the water in storage in said tank with a UV sterilizer in said tank.

\* \* \* \* \*